(12) United States Patent
Huethwohl et al.

(10) Patent No.: US 8,549,844 B2
(45) Date of Patent: Oct. 8, 2013

(54) EXHAUST GAS AFTER TREATMENT APPARATUS OF A MOTOR VEHICLE

(75) Inventors: Georg Huethwohl, Soest (DE); Thomas Kaestner, Dortmund (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 451 days.

(21) Appl. No.: 12/529,646

(22) PCT Filed: Mar. 3, 2008

(86) PCT No.: PCT/EP2008/001680
§ 371 (c)(1),
(2), (4) Date: Sep. 2, 2009

(87) PCT Pub. No.: WO2008/107151
PCT Pub. Date: Sep. 12, 2008

(65) Prior Publication Data
US 2010/0050618 A1 Mar. 4, 2010

(30) Foreign Application Priority Data
Mar. 3, 2007 (DE) .......................... 10 2007 010 486

(51) Int. Cl.
*F01N 3/24* (2006.01)
(52) U.S. Cl.
USPC .............................................. 60/295; 60/301
(58) Field of Classification Search
USPC ................... 60/295, 296, 301, 303
See application file for complete search history.

(56) References Cited

U.S. PATENT DOCUMENTS

| | | | |
|---|---|---|---|
| 3,337,939 A | 8/1967 | Parkinson | |
| 5,392,602 A | 2/1995 | Matsumoto | |
| 6,312,650 B1 * | 11/2001 | Frederiksen et al. | 422/180 |
| 2006/0153748 A1 * | 7/2006 | Huthwohl et al. | 422/172 |
| 2006/0191254 A1 * | 8/2006 | Bui et al. | 60/286 |

FOREIGN PATENT DOCUMENTS

| | | |
|---|---|---|
| CA | 1 262 869 | 11/1989 |
| DE | 195 14 829 A1 | 10/1995 |
| DE | 101 23 359 | 11/2002 |
| EP | 1 536 113 | 6/2005 |
| JP | 2001 050027 | 2/2001 |
| JP | 2004 150310 | 5/2004 |
| WO | WO 2005040566 A1 * | 5/2005 |
| WO | WO 2007004940 A1 * | 1/2007 |

\* cited by examiner

*Primary Examiner* — Kenneth Bomberg
*Assistant Examiner* — Jonathan Matthias
(74) *Attorney, Agent, or Firm* — McGlew and Tuttle, P.C.

(57) ABSTRACT

The invention relates to an exhaust gas after treatment apparatus having a hollow cylindrical casing shell (2). In the inside an exhaust catalytic converter, preferably adapted as SCR-catalytic converter, as well as an inflow chamber (9) for exhaust gas to be purified are provided. Therein, the inflow chamber (9) is defined by two bottom portions (10, 11) arranged opposite to each other. Further, a shell portion (12) gas tightly encompassing the bottom portions (10, 11) is provided for the inflow chamber (9). The inflow chamber (9) is encompassed by the casing shell (2) and may be manufactured from a material different from a material of the casing shell.

15 Claims, 3 Drawing Sheets

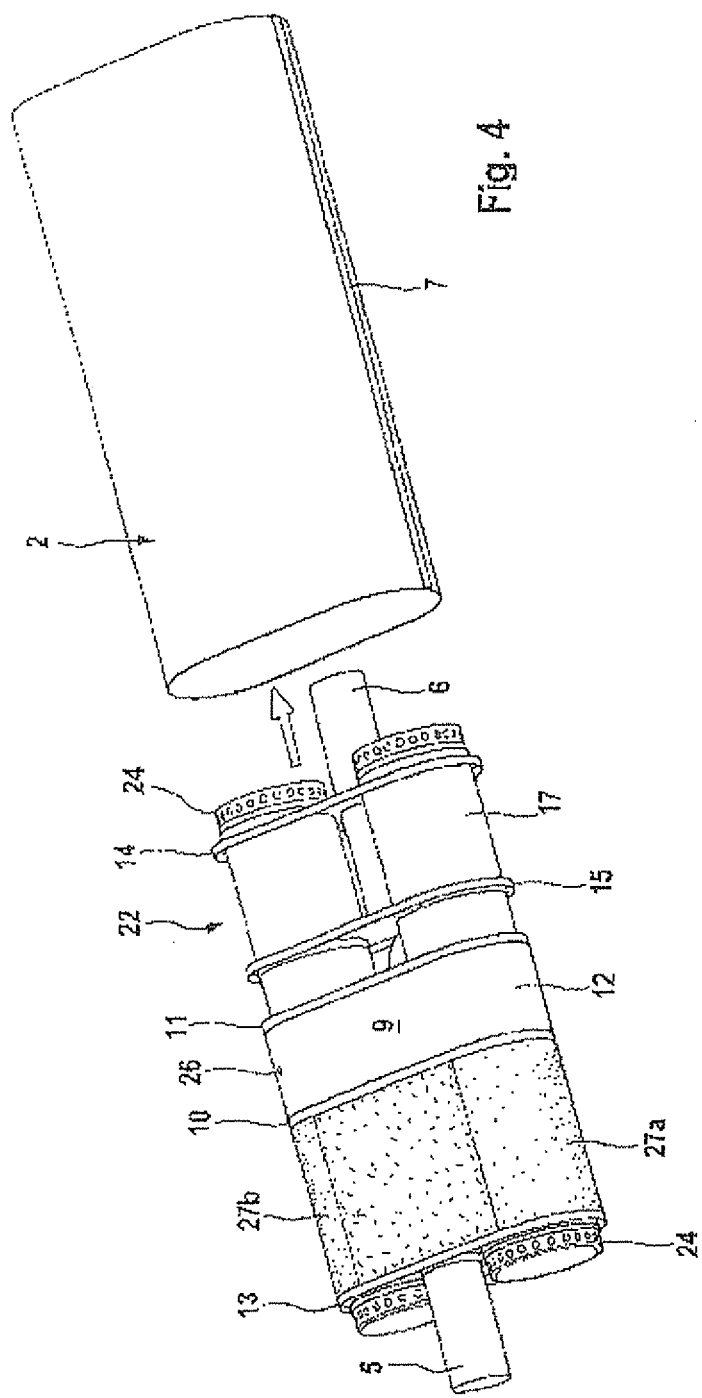

EXHAUST GAS AFTER TREATMENT APPARATUS OF A MOTOR VEHICLE

CROSS REFERENCE TO RELATED APPLICATIONS

This application is a United States National Phase Application of International Application PCT/EP2008/001680 and claims the benefit of priority under 35 U.S.C. §119 of German Patent Application DE 10 2007 010 486.5 filed Mar. 3, 2007, the entire contents of which are incorporated herein by reference.

TECHNICAL BACKGROUND OF THE INVENTION

1. Technical Field

The invention relates to an exhaust gas after treatment apparatus of a motor vehicle, the exhaust gas after treatment apparatus comprising a hollow cylindrical casing shell inside of which a catalytic converter and an inflow chamber, for receiving exhaust gas to be purified by the exhaust gas catalytic converter, are arranged. Therein, the inflow chamber is defined by a first bottom portion and a second bottom portion arranged spaced apa rt from, and opposite to the first bottom portion.

2. Brief Description of the Prior Art

From DE 101 23 359 A1 an exhaust gas after treatment apparatus of a motor vehicle having a hollow cylindrical casing shell is known, wherein inside the casing shell an exhaust gas catalytic converter and an inflow chamber, for receiving exhaust gas to be purified by the exhaust gas catalytic converter, are arranged. Therein, the inflow chamber is defined by a first bottom portion and a second bottom portion arranged spaced apart from, and opposite to the first bottom portion.

Such exhaust gas after treatment apparatuses represent, in particular for application in commercial vehicles, already due to their casing size, a considerable cost factor.

SUMMARY OF THE INVENTION

Therefore it is an object of the invention to propose an exhaust gas after treatment apparatus having an advantageous compartment distribution.

According to an embodiment the exhaust gas after treatment apparatus comprises an inflow chamber for receiving exhaust gas to be purified by the exhaust gas catalytic converter, wherein the inflow chamber is defined, besides first and second bottom portions, by a shell portion encompassing the bottom portions in a gas tight connection. Thus, the inflow chamber is configured as a part separate from the casing shell of the exhaust gas after treatment apparatus, whereby an increased flexibility for the geometric and the material specific design is enabled. By the embodiment according to the invention in particular conceptual disadvantages are avoided which may arise when the casing shell of the exhaust gas after treatment apparatus itself serves as confinement of the inflow chamber. The casing shell of the exhaust gas after treatment apparatus in this embodiment encompasses the inflow chamber and is oriented concentrically to the shell portion of the inflow chamber. The volume, respectively the size, of the inflow chamber may substantially be determined by a choice of the distance of the bottom portions preferably oriented in parallel to each other.

In an embodiment of the invention the first and the second bottom portions as well as the shell portion are manufactured from a first material having a high corrosion resistance and the casing shell is manufactured from a second material having a comparatively lower corrosion resistance.

Typically, the first material is a corrosion resistant high-grade steel and the second material is a low-alloyed and thus, compared to the first material, more cost-effective metal sheet. Since the portions limiting the inflow chamber manufactured by the first material typically account for a comparatively small material proportion of the exhaust gas after treatment apparatus, respectively the casing, the application of the comparatively expensive first material is defined to this small proportion. In this way the total expense for the exhaust gas after treatment apparatus manufactured only to a small pro portion from high-grade steel is reduced compared to an exhaust gas after treatment apparatus predominantly manufactured from high-grade steel.

Despite the manufacture of the casing shell from a material having comparatively low corrosion resistance a very good resistance can be achieved. The reason for this is that due to the construction of the exhaust gas after treatment apparatus the casing shell is contacted merely with exhaust gas already purified by the exhaust gas catalytic converter and thus corrosive to a low extent. The portions of the exhaust gas after treatment apparatus, respectively of the casing, being contacted by unpurified exhaust gas which portions comprise the bottom portions and the shell portion of the inflow chamber are in contrast made more resistant, corresponding to their higher corrosion exposure.

In an embodiment of the invention an inflow side end of the exhaust gas catalytic converter is arranged in the inflow chamber. Therein, the wider cylindrical shell portion provided for the corpus of the catalytic converter body itself penetrates a bottom portion such that a circumferential gas tight connection with the bottom portion is achieved. In this way exhaust gas flowing into the inflow chamber is forced to enter into the exhaust gas catalytic converter due to a lack of other possibilities for flowing out. The bottom portion therein in an advantageous way simultaneously serves as a mechanical support and as a holder for the exhaust gas catalytic converter.

In a further embodiment of the invention a supply pipe leading into the inflow chamber is provided via which exhaust gas enriched with a reducing agent may be introduced into the inflow chamber. According to an embodiment the supply pipe is also manufactured from a material having high corrosion resistance, in particular also from the first material. Thus, it is ensured that along the path of the supply of the corrosive unpurified exhaust gas no corrosion of portions exposed thereto occurs. An increased corrosion resistance is particularly advantageous, because exhaust gas enriched with the reducing agent has a still increased corrosivity.

This is in particular the case, when, as preferably provided, urea or another ammonia releasing reducing agent is employed as reducing agent.

In a further embodiment of the invention the exhaust gas after treatment apparatus comprises a collection chamber adjacent to the inflow chamber and provided for receiving exhaust gas purified by the exhaust gas catalytic converter. In this way a space-saving and aerodynamic construction may be achieved.

This is further improved, when in a further embodiment of the invention a transfer pipe is provided for the exhaust gas after treatment apparatus via which exhaust gas purified by the exhaust gas catalytic converter may be led from an outflow side of the exhaust gas catalytic converter into the collection chamber.

In a further embodiment of the invention the transfer pipe is perforatedly designed in sections. Therein, a sound damping effect results. Due to the noise reduction therein achieved a separate silencer may occasionally be dispensed with.

In a further embodiment of the invention the supply pipe and/or the transfer pipe extend across the substantial portion of their lengths within the casing shell, respectively within the hollow cylinder formed by the casing shell, along the exhaust gas catalytic converter. By an elongated design of the supply pipe an optimal conditioning of reducing agent added to the exhaust gas is enabled along the exhaust gas supply path. This is in particular advantageous in the case of urea or a reducing agent releasing ammonia, since a sufficient hydrolysis of the reducing agent along the supply path is enabled. In the case of an elongated design of the transfer pipe in contrast in particular in the combination with its perforation an advantageous noise damping is enabled. Further, a compact design of the casing is enabled, since the supply pipe and/or the transfer pipe may advantageously be integrated in resulting free spaces of the casing. This is in particular the case, when in a further embodiment of the invention the exhaust gas after treatment apparatus is adapted for accommodating an exhaust gas catalytic converter formed from at least two separate catalytic converter elements. When the casing of the exhaust gas after treatment apparatus accommodates more than one catalytic converter, interspaces result within the casing which may be used in an advantageous way for the arrangement of the supply pipe, respectively the transfer pipe. This is in particular the case, when a parallel arrangement of two or more catalytic converter elements is provided. Further, this is in particular the case, when catalytic converter elements, regarded by themselves, each have an approximately cylindrical shape, and when the entrance and the exit of the exhaust gas occurs at the lower, respectively upper, base area of the cylinder.

In a further embodiment of the invention the exhaust gas after treatment apparatus is adapted such that a first and a second of the at least two catalytic converter elements may be flown through in opposite directions by the exhaust gas to be purified coming from the inflow chamber. In this way catalytic converter elements may be spatially successively arranged in the same casing, wherein a slim construction is achieved. Therefrom, in many cases installation advantages result. Depending on number and design of the catalytic converter elements in this way also a beneficial ratio between surface and volume may be achieved and thus material saving may be achieved.

In a further embodiment of the invention the casing shell is manufactured from a metal sheet cut part having two sides arranged opposite to each other, wherein the sides arranged opposite to each other are connected to each other by crimping upon forming a hollow cylinder. Thereby, a particularly cost effective manufacture, respectively design, of the case and thus of the entire exhaust gas after treatment apparatus is achieved. The crimping may be adapted such that a certain amount of leakage is tolerated that however is uncritical, since the casing shell is pressurized merely by exhaust gas purified by the exhaust gas catalytic converter.

BRIEF DESCRIPTION OF THE FIGURES

Advantageous embodiments of the invention are illustrated in the drawings and are described below. Thereby, the aforementioned and subsequently to be explained features are usable not only in the respectively given feature combination but also in other combinations or alone, without leaving the scope of the present invention. It is shown.

DETAILED DESCRIPTION OF EXEMPLARY EMBODIMENTS

Figure 1:
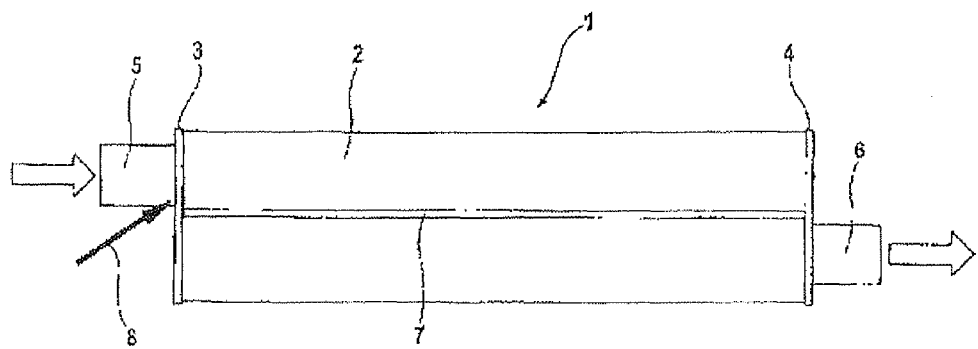
FIG. 1 an entire view of an advantageous embodiment of the exhaust gas of ter treatment apparatus according to the invention, FIG. 2 a first interior view of the exhaust gas after treatment apparatus according to FIG. 1, FIG. 3 a second interior view of the exhaust gas after treatment apparatus according to FIG. 1, FIG. 4 a first view relating to the assembly of the exhaust gas after treatment apparatus according to FIG. 1, and FIG. 5 a second view relating to the assembly of the exhaust gas after treatment apparatus according to FIG. 1.

FIG. 1 shows an advantageous embodiment of the exhaust gas after treatment apparatus 1 according to the invention in an entire view illustrating a completely mounted condition from outside. According to the illustrated arrows the exhaust gas entrance occurs from the left hand side via a supply pipe 5. Purified exhaust gas leaves the exhaust gas after treatment apparatus 1 via an exhaust pipe 6. The casing of the exhaust gas after treatment apparatus 1 comprises a hollow cylindrical casing shell 2 which is sealed at the ends by a first closing cap 3, respectively a second closing cap 4. According to the invention it is envisaged, to make the casing shell 2 from a cost effective material as for example a hot-dip aluminium coated fine metal sheet. This may be formed in the initial state from a metal sheet cut part which is formed into a previously givable cylindrical form. In a, with respect to a manufacturing technique, advantageous way two sides of the metal sheet cut part arranged opposite to each other may be connected to each other by a crimping connection 7. Therein, the circumferential-side casing portion of the exhaust gas after treatment apparatus 1 results. Similarly, the closing caps 3, 4 may be manufactured from the same material as the casing shell 2. In this way a particularly unproblematic and reliable border side connection of the closing caps 3, 4 with the casing shell 2 is enabled. At the through holes for the supply pipe 5 and the exhaust pipe 6 feather edges may be provided which are surroundingly connected to the supply pipe 5 and the exhaust pipe 6.

The supply pipe 5 is preferably manufactured from a material having a higher corrosion resistance compared to the casing shell 2. Therein, the fact is taken into account that the exhaust gas supplied to the exhaust gas after treatment apparatus 1 may have an increased corrosivity. Preferably, an austenitic high-grade steel is employed for the supply pipe 5. Depending on corrosivity of the exhaust gas also another high-grade steel material, for example a ferritic high-grade steel, may be employed.

Although the exhaust gas after treatment apparatus 1 according to the invention is employable for different combustion engines, it is designed in an advantageous way for removing nitrogen oxides from the exhaust gas of diesel engines of commercial vehicles. Therefore, inside the exhaust gas after treatment apparatus 1 an SCR-module (SCR=selective catalytic reduction) having preferably plural SCR-catalytic converters for selective reduction of nitrogen oxides using ammonia or another selective nitrogen oxide reducing agent is provided which is illustrated in detail in the subsequent Figures. Addition of reducing agent 8, for example from aqueous urea solution, into the supply pipe 5 is performed from outside using an adding apparatus, not illustrated. The position of delivery of the reducing agent into the exhaust gas may therein lie within or also outside the casing. In the latter case the addition of reducing agent 8 to the exhaust gas may be provided in immediate proximity of the exhaust gas entrance. It may be envisaged to fix the adding apparatus to the exhaust gas after treatment apparatus 1, or respectively to its casing, wherein an entire module is formed which is simply exchangeable and mountable.

Figure 2:
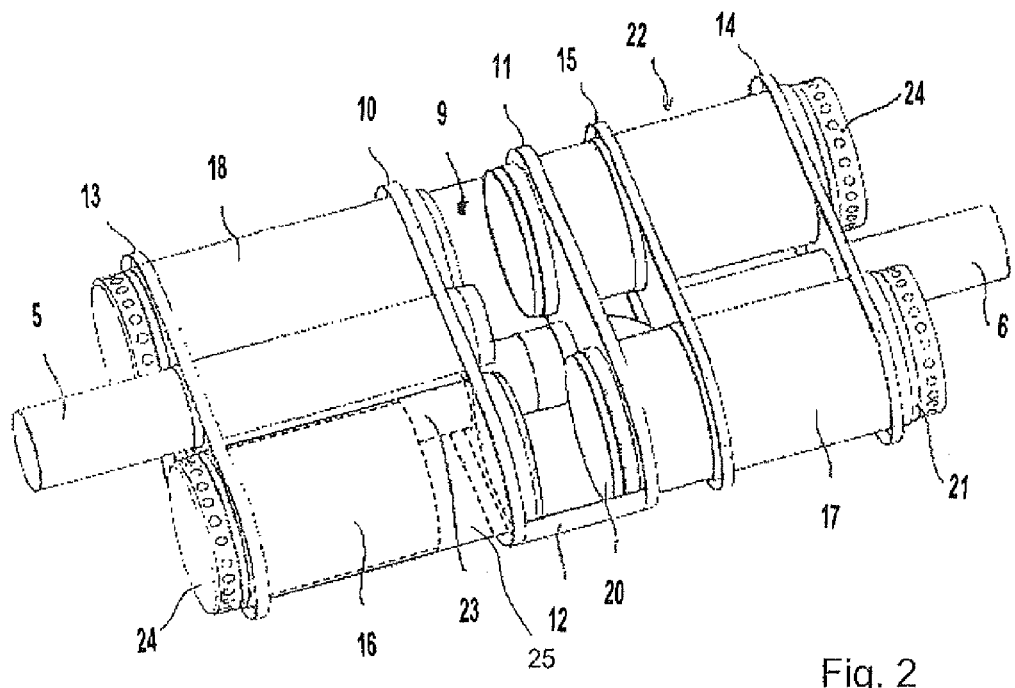
Figure 3:
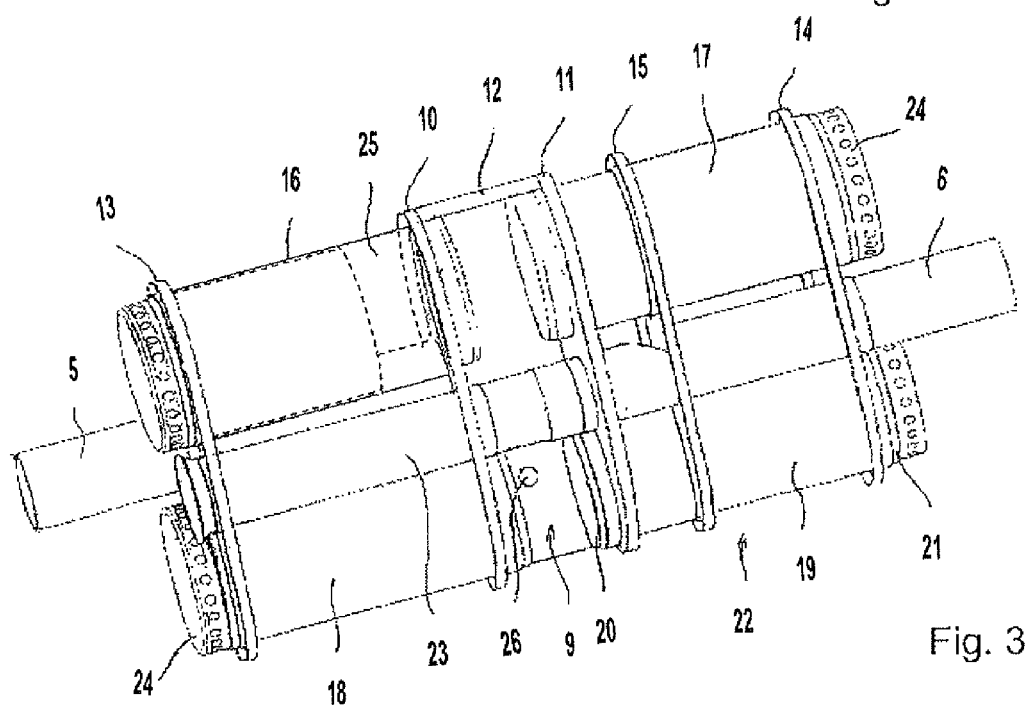

The FIGS. 2 and 3 show the exhaust gas after treatment apparatus 1 according to FIG. 1 in different perspective views each with disassembled casing shell 2 and removed closing caps 3, 4. In the illustrated preferred embodiment four separate SCR-catalytic converter elements 16, 17, 18, 19 are provided. Therein, two catalytic converter elements arranged side by side 16, 18, respectively 17, 19, are connected in parallel according to the flow. Naturally, the application of fewer, or also more catalytic converter elements is also possible. Preferably the catalytic converter elements 16, 17, 18, 19 each comprise a monolithic catalytic converter core in a construction form of a comb body and a metal shell 25 having a low strength of about 1.5 mm encompassing this catalytic converter comb and preferably being manufactured from high-grade steel. Therein, the catalytic converter core is preferably arranged with an encompassing bearing mat as balance element, isolating element and protecting element. The catalytic converter core may, mostly or only to a lower degree, fill the metal shell with respect to its longitudinal extension. In this way catalytic converter cores having different sizes may be arranged in one and the same exhaust gas after treatment apparatus 1. It is also possible to provide the exhaust gas after treatment apparatus 1 with catalytic converter cores of the same size which however may be individually chosen, for example adapted to the engine size. Further, it is possible to arrange in a metal shell 25 two or more catalytic converter cores spaced apart from each other, occasionally having different catalytic properties. For example an oxidation catalytic converter element may be arranged in one and the same metal shell 25 upstream and/or downstream from a SCR-catalytic converter element. In this way a further improved and more complete exhaust gas purification may be achieved. Herein, a catalytic converter core is in the broadest sense understood to also comprise a particle filter body. For simplicity it is subsequently referred to a catalytic converter element for the possible arrangements described.

For a better understanding the exhaust gas flow path inside the exhaust gas after treatment apparatus 1 resulting from the construction according to the invention is subsequently explained. The exhaust gas supplied to the exhaust gas after treatment apparatus 1 via the supply pipe 5 initially reaches an inflow chamber 9. The supply pipe 5 runs approximately parallel along the catalytic converter elements 16, 18. Because of the, with respect to the exhaust gas after treatment apparatus 1, approximately central arrangement of the inflow chamber 9 a preset flow distance, respectively flow time, results for the exhaust gas which enables in an advantageous way a homogeneous distribution of reducing agent supplied to the exhaust gas. In the case of urea a hydrolysis upon release of ammonia is enabled along the flow distance in the supply pipe 5. In this way optimally conditioned reducing agent reaches the inflow chamber 9 together with the exhaust gas.

The inflow chamber 9 is defined at both sides by a bottom portion 10, 11, respectively, and is circumferentially defined by a hollow cylindrical shell portion 12, wherein the shell portion 12 encompasses the bottom portions 10, 11 in a gas tight connection. For a clear representation the shell portion 12 is only partly illustrated; due to the non-shown part the inside of the inflow chamber 9 is also visible. As is to be recognized each of the catalytic converter elements 16, 18, respectively their metal shell 25, traverse the first bottom portion 10 and the catalytic converter elements 17, 19 traverse the opposite arranged second bottom portion 11, such that the catalytic converter elements 16, 17, 18, 19 protrude with their respective inflow side ends into the inflow chamber 9. Preferably a thread opening 26 is provided for accommodating an exhaust gas sensor and/or temperature sensor in the shell portion 12 of the inflow chamber 9. In this way exhaust gas properties present at an inflow side of the catalytic converter elements 16, 17, 18, 19 may be acquired.

For lack of another possibility of outflow the exhaust gas led into the inflow chamber 9 is forced on one hand through the catalytic converter elements 16, 18 and on the other hand in the opposite direction through the catalytic converter elements 17, 19. Exhaust gases purified by the catalytic converter elements 16, 17, 18, 19 exit at their outflow side ends at oppositely arranged end portions of the exhaust gas after treatment apparatus 1. For clarification the inflow side end and the outflow side end of the catalytic converter element 17 are denominated by reference numbers 20 and 21, respectively. Therein, the bottom portions 10, 11 of the inflow chamber 9 serve for leading the gas and also for bearing the catalytic converter elements 16, 17, 18, 19 at their inflow sides. At the outflow side the catalytic converter elements 16, 17, 18, 19 are held in position by intermediate floors 13, 14. According to the present embodiment the outflow side ends of the catalytic converter elements 16, 17, 18, 19 are each provided with an exhaust cage 24, adapted as cap and closed at a face side, which is hove ver circumferentially perforated. In this way a homogeneous distribution of outflowing exhaust gas may be achieved.

The outflow region of the left catalytic converter elements 16, 18 oriented toward the supply pipe 5 is on one hand defined by the first closing cap 3 and on the other hand by the first intermediate floor 13 as well as by the encompassing casing shell 2. The outflow region of the right catalytic converter elements 17, 19 oriented towards the exhaust pipe 6 is on one hand defined by the second closing cap 4 and on the of her hand by the second intermediate floor 14 as well as by the encompassing casing shell 2. Therein, for reason of guiding the gas, it is envisaged to design the first intermediate floor 13 in closed form and to design the second intermediate floor 14 in a perforated form. At least for the first intermediate floor 13 a sealing with the traversed catalytic converter elements and pipes is provided.

In the outflow region of the left catalytic converter elements 16, 18, out flowing exhaust gas is led through a transfer pipe 23 along the catalytic converter elements 16, 18 and is led approximately parallel to the supply pipe 5 through the in flow chamber 9 to the other side of the exhaust gas after treatment apparatus 1. There, a mixing with exhaust gas flown out of the outflow region of the right catalytic converter elements 17, 19 may occur. Therein, the second bottom portion 11 of the inflow chamber 9 and the second intermediate floor 14 form, together with the casing shell 2, a collection chamber 22 for exhaust gases purified by the catalytic converter elements 16, 17, 18, 19. In the collection chamber 22 collected exhaust gas is discharged via the exhaust pipe 6 from the exhaust gas after treatment apparatus 1. In this embodiment, a third perforatedly designed intermediate floor 15 is provided which separates the space between second bottom portion 11 of the inflow chamber and the second intermediate floor 14 in a ratio of about 2:1. To the third intermediate floor 15 also the exhaust pipe 6 may be fixed, wherein an improved stability results. However, this third intermediate floor 15 is only optional.

According to an alternative embodiment, not shown in the Figures, the transfer pipe 23 may be perforated in the region between the first intermediate floor 13 and the first bottom portion 10. Further, the exhaust pipe 6 may be perforated in the region between the second intermediate floor 15 and the third intermediate floor 14. In this way an effective silencer may be achieved, wherein a separate sound damper in the exhaust gas apparatus of a corresponding motor vehicle may occasionally be dispensed with. The sound damping is additionally assisted by the perforation of the intermediate floors 14, 15, wherein due to the perforation a weight reduction and material saving is simultaneously achieved.

In the present embodiment, via the design of the perforation of at least one of the second and the third intermediate floors 14, 15 its flow resistance is adjusted such that a homogeneous distribution of the exhaust gas flows through the catalytic converter elements 16, 18 on one hand and 17, 19 on the other hand, which are arranged on both sides of the inflow chamber 9, is achieved. A further improvement of the flow conditions and of the acoustic properties of the exhaust gas after treatment apparatus 1 is achieved, when the open end of the exhaust pipe 6 ends in a blunt way and with a low distance in front of the third intermediate floor 15 and when the latter does not have a perforation in this region.

With respect to the used material it is envisaged, to design those portions in corrosion resistant high-grade steel that contact unpurified exhaust gas. This mainly relates to bottom portions 10, 11 and the shell portion 12 which limit the inflow chamber 9. Beside the supply pipe 5 also the transfer pipe 23 may however be manufactured from corrosion resistant high-grade steel. Although the exhaust pipe 6 only contacts purified exhaust gas, also the exhaust pipe 6 may be de signed in high-grade steel. In this way a larger degree of same parts and thus also cost saving is achieved. The shells of the catalytic converter elements 16, 17, 18, 19 are preferably likewise manufactured from corrosion resistant high-grade steel. On the contrary it is envisaged to employ for the second and the third intermediate floors 14, 15, an ologous to the casing shell 2, a cost effective, less corrosion resistant material.

After assembly of elements of the exhaust gas after treatment apparatus 1, as explained referring to FIGS. 2 and 3, an installation module is obtained which as such may be inserted into the adequately formed hollow cylindrical casing shell 2, as clarified in FIG. 4. Therein, in FIG. 2 a damping, respectively isolation, is illustrated which is arranged in the region between the first intermediate floor 13 and the first bottom portion 10 and which fills the hollow spaces and intermediate spaces in this region. The damping preferably made from filamentous material enables an improvement of the sound damping and decreases undesired heat losses. Therein, it is advantageous when the damping is made different in different regions. Preferably in a first region 27a having a greater curvature another material is employed than in a second region 27b filling the intermediate space between the catalytic converter elements 16, 18. In this way a particularly beneficial combination of thermal isolation properties and flow and sound damping properties may be achieved. Although not illustrated in FIG. 4, also for the collection chamber 22 a filling, occasionally partly, with damping material may be provided.

Figure 5:
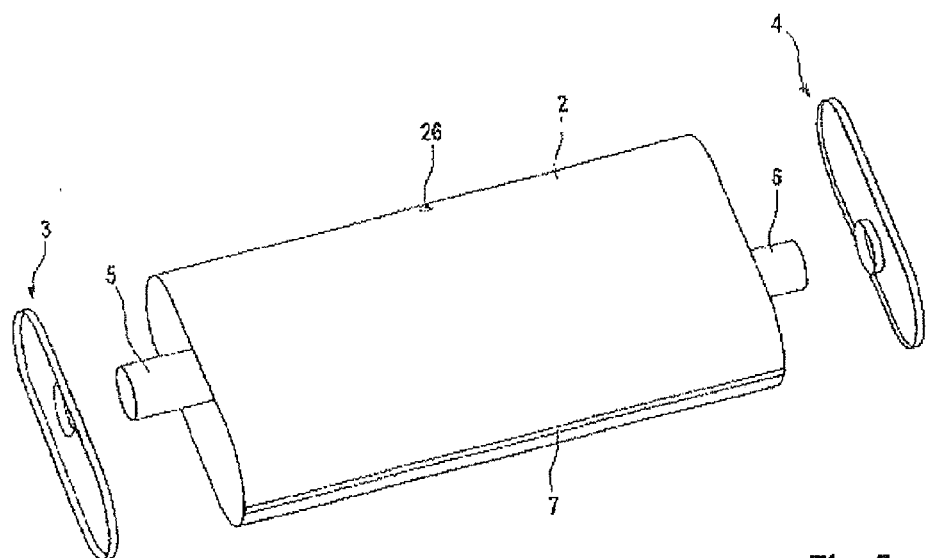

FIG. 5 shows a view relating to the assembly of the exhaust gas after treatment apparatus 1 after insertion of the obtained module into the casing shell 2, as sketched in FIG. 4. With insertion of the closing caps 3, 4 and their connection with the casing shell 2 at their border sides as well as with the supply pipe 5, respectively the exhaust pipe 6, the exhaust gas after treatment apparatus 1, already illustrated in FIG. 1 in an overview, is substantially completed. For the completely mounted condition a substantially flush abutment of the casing shell 2 at the intermediate floors 13, 14, 15, at the bottom portions 10, 11 and at the shell portion 12 of the inflow chamber 9 as well as at the provided damping material portions 27a, 27b is provided, wherein however a gas tight abutment is not required. Rather, a low gap measure may be provided, wherein inserting the casing shell 2 over is facilitated.

According to an embodiment high-alloy high-grade steel is employed as first higher corrosion resistant material. A high-alloy high-grade steel refers to a high-grade steel having an alloy proportion of above 5%. According to an embodiment a high-alloy high-grade steel having a carbon portion of less than 1% and in particular less than 0,1%, and having a chromium portion of at least 12% is employed as corrosion resistant material. An example for a corresponding steel is V4-steel. According to an embodiment ferritic steel having 12% to 18% chromium contents, as for example X2CrTi12 (1.4512), X2CrTiNb18 (1.4509) or X3CrTi17 (1.4510) is employed as corrosion resistant material. According to a further embodiment the high-alloy high-grade steel has a titanium proportion of over 1%.

This higher corrosion resistance material is used according to an embodiment for the portions contacting unpurified gas, as in particular the supply pipe 5 and the inflow chamber 9 (and thus the bottom portions 10, 11 and the shell portion 12). Further, this material may for example be used for the metal shells 25 of the catalytic converter elements 16, 17, 18, 19, the transfer pipe 23 and the exhaust pipe 6.

According to an embodiment low-alloy steel and in particular a hot-dip aluminium fine metal sheet is used as the second, less corrosion resistant material. This may according to an embodiment, have an aluminium-silicon coating of 50 to 200 g/qm. This coating may be provided at both sides. Additionally, the material may be protected against corrosion by at least one of oiling and passivation (as for example chromium coating). According to an embodiment the aluminium-silicon ratio amounts to 90% Al to 10% Si. This less corrosion resistant material is used, according to an embodiment, for the intermediate floors 13, 14, 15, the closing caps 2, 3, the casing shell 2, the exhaust pipe 6 and the transfer pipe 23.

According to an embodiment at least the section of the transfer pipe 23 within the inflow chamber 9 is formed from the first material having higher corrosion resistance or is surrounded by a shell of this material.

Further, according to an alternative embodiment, an isolating spacer piece not conducting an electrical current (not shown in the Figures) is arranged at the contact locations between a material having higher corrosion resistance and a material having lower corrosion resistance. This isolating spacer piece may for example be adapted in form of a finish, a film, an adhesive or a coating. Therein, the risk of corrosion at these contact locations is reduced. Relevant contact locations are for example the abutment faces between the supply pipe 5 and the closing cap 3 as well as the first intermediate floor 13, the abutment faces between the catalytic converter elements 16, 17, 18, 19 and the intermediate floors 13, 14 and 15, as well as the abutment faces between the bottom portions 10, 11, respectively the shell portion 12 and the casing shell 2. Whether between exhaust pipe 6, respectively transfer pipe 23, and the intermediate floors 13, 14, and 15, respectively the closing cap 4, or between transfer pipe 23 and the bottom portion 10, 11 further relevant contact locations are present, depends on whether for the exhaust pipe 6, respectively transfer pipe 23, material of higher or lower corrosion resistance is used.

The exhaust gas after treatment apparatus is in particular suited for vehicles having a diesel engine.

The invention claimed is:

1. An exhaust gas after treatment apparatus in a motor vehicle, the exhaust gas after treatment apparatus comprising:
    a supply pipe for supplying exhaust gas to be purified;
    an inflow chamber;
    a first catalytic converter element and a second catalytic converter element for purifying the exhaust gas, wherein a flow of fluid through said first catalytic converter element is in a direction opposite a flow of fluid through said second catalytic converter element;
    a collection chamber for collecting the exhaust gas purified by at least said first catalytic converter element; and
    an exhaust pipe for discharging purified exhaust gas, wherein the supply pipe and the inflow chamber are manufactured from a first material having a higher corrosion resistance against the exhaust gas to be purified, wherein at least the collection chamber is formed from a second material having a lower corrosion resistance against the exhaust gas to be purified, wherein the inflow chamber is adapted to distribute the exhaust gas to be purified to said first catalytic converter element and said second catalytic converter element, at least a portion of said inflow chamber being arranged between said first catalytic converter element and said second catalytic converter element, at least a portion of one end portion of said supply pipe being arranged in at least a portion of said inflow chamber.

2. The exhaust gas after treatment apparatus according to claim 1, wherein the inflow chamber and the collection chamber are arranged adjacent to each other.

3. The exhaust gas after treatment apparatus according to claim 1, wherein the first catalytic converter element has an inflow side end as well as an outflow side end, wherein the inflow side end is arranged in the inflow chamber and wherein the outflow side end is arranged in the collection chamber.

4. The exhaust gas after treatment apparatus according to claim 1, wherein said first catalytic converter element comprises a first catalytic converter element inlet, said second catalytic converter element comprising a second catalytic converter element inlet, said first catalytic converter element inlet being opposite said second catalytic converter element inlet with respect to a longitudinal axis of said first catalytic converter element and said second catalytic converter element.

5. The exhaust gas after treatment apparatus according to claim 1, further comprising:
    a casing, at least a portion of said casing and said first catalytic converter element defining an outflow region, at least another portion of said casing and said second catalytic element defining a collection chamber;
    a transfer pipe in communication with said collection chamber and said outflow region, wherein said inflow chamber, said first catalytic element, said outflow region, said transfer pipe and said collection chamber define a first fluid path, said inflow chamber, said second catalytic converter element and said collection chamber defining a second fluid path, wherein fluid supplied to said inflow chamber passes along one of said first fluid path and said second fluid path.

6. The exhaust gas after treatment apparatus according to claim 1, wherein each of said first catalytic converter element and said second catalytic converter element receives a flow of fluid from said inflow chamber such that the flow of fluid through said first catalytic converter element is in a direction opposite the flow of fluid through said second catalytic converter element.

7. An exhaust gas after treatment apparatus in a motor vehicle, the exhaust gas after treatment apparatus comprising:
    a supply pipe for supplying exhaust gas to be purified;
    an inflow chamber;
    a first catalytic converter element and a second catalytic converter element for purifying the exhaust gas, wherein a flow of fluid through said first catalytic converter element is in a direction opposite a flow of fluid through said second catalytic converter element;
    a collection chamber for collecting the exhaust gas purified by at least said first catalytic converter element;
    an exhaust pipe for discharging purified exhaust gas, wherein the supply pipe and the inflow chamber are manufactured from a first material having a higher corrosion resistance against the exhaust gas to be purified, wherein at least the collection chamber is formed from a second material having a lower corrosion resistance against the exhaust gas to be purified;
    a casing, at least a portion of said casing and said first catalytic converter element defining an outflow region, at least another portion of said casing and said second catalytic element defining a collection chamber; and
    a transfer pipe in communication with said collection chamber and said outflow region, wherein said inflow chamber, said first catalytic element, said outflow region, said transfer pipe and said collection chamber define a first fluid path, said inflow chamber, said second catalytic converter element and said collection chamber defining a second fluid path, wherein fluid supplied to said inflow chamber passes along one of said first fluid path and said second fluid path.

8. An exhaust gas after treatment apparatus in a motor vehicle, comprising:
    an exhaust gas catalytic converter comprising a first catalytic converter element and a second catalytic converter element, wherein a flow of fluid through said first catalytic converter element is in a direction opposite a flow of fluid through said second catalytic converter element;
    a first bottom portion;
    a second bottom portion arranged at a spaced location from said first bottom portion, said first bottom portion being arranged opposite said second bottom portion;
    a shell portion encompassing said first bottom portion and said second bottom portion in a gas tight connection;
    a hollow cylindrical casing shell, inside of which said exhaust gas catalytic converter and an inflow chamber, for receiving exhaust gas to be purified by the exhaust gas catalytic converter, are arranged, wherein the inflow chamber is defined by said first bottom portion, said second bottom portion and said shell portion, wherein the first bottom portion and the second bottom portion and the shell portion comprise a first material having a high corrosion resistance and wherein the casing shell comprises a second material having a comparatively lower corrosion resistance, at least a portion of said casing shell and said first catalytic converter element defining an outflow region, at least another portion of said casing shell and said second catalytic converter element defining a collection chamber; and
    a transfer pipe in communication with said collection chamber and said outflow region, said inflow chamber, said first catalytic element, said outflow region, said transfer pipe and said collection chamber defining a first fluid path, said inflow chamber, said second catalytic converter element and said collection chamber defining a second fluid path, wherein fluid supplied to said inflow chamber passes along one of said first fluid path and said second fluid path.

9. The exhaust gas after treatment apparatus according to claim 1, wherein an inflow side end of the exhaust gas catalytic converter is arranged in the inflow chamber.

10. The exhaust gas after treatment apparatus according to claim 1, wherein a supply pipe leading into the inflow chamber is provided via which exhaust gas enriched with a reducing agent can be introduced into the inflow chamber.

11. The exhaust gas after treatment apparatus according to claim 10, wherein at least one of the supply pipe and a portion of a length of the transfer pipe extends within the casing shell along the exhaust gas catalytic converter.

12. The exhaust gas after treatment apparatus according to claim 11, wherein the casing shell is manufactured from a metal sheet cut part having two sides arranged opposite to each other, wherein the sides arranged opposite to each other are connected with each other by crimping upon forming a hollow cylinder.

13. The exhaust gas after treatment apparatus according to claim 1, wherein at least a portion of said inflow chamber is located between said first catalytic converter element and said second catalytic converter element.

14. The exhaust gas after treatment apparatus according to claim 1, wherein said collection chamber is adjacent to the inflow chamber and provides for receiving exhaust gas purified by the exhaust gas catalytic converter.

15. The exhaust gas after treatment apparatus according to claim 14, wherein the exhaust gas purified by the exhaust gas catalytic converter can be led from an outflow side of the exhaust gas catalytic converter into the collection chamber via said transfer pipe.

* * * * *